US006387474B1

(12) United States Patent
Richards

(10) Patent No.: US 6,387,474 B1
(45) Date of Patent: May 14, 2002

(54) CHROMATIC COLORIZATION FOR TOY VEHICLES

(76) Inventor: David W. Richards, 519 Callet St., Palmdale, CA (US) 93550

(*) Notice: Subject to any disclaimer, the term of this patent is extended or adjusted under 35 U.S.C. 154(b) by 0 days.

(21) Appl. No.: 09/379,240

(22) Filed: Aug. 23, 1999

Related U.S. Application Data

(60) Provisional application No. 60/097,683, filed on Aug. 24, 1998.

(51) Int. Cl.[7] .............................. B32B 3/00; B32B 5/16; B32B 7/14

(52) U.S. Cl. ........................................ 428/204; 428/206

(58) Field of Search .................................. 428/204, 206

(56) References Cited

U.S. PATENT DOCUMENTS 4,663,214 A * 5/1987 Coburn, Jr. ................. 428/204
4,863,782 A * 9/1989 Wang et al. ................ 428/204

* cited by examiner

*Primary Examiner*—Bruce H. Hess
*Assistant Examiner*—B. Shewareged
(74) *Attorney, Agent, or Firm*—Roger A. Marrs

(57) ABSTRACT

An external top coating on a toy vehicle provides a multi-color or hue variation dependent upon the angle at which illuminating rays or energy strike the coating. The coating is applied directly over previously applied color coating and application may be by spray, brush or airbrush. The external coating is characterized as combining a plurality of pigments into a carrying medium which is then applied to the exposed surface of a previously coated toy vehicle. The multi-pigmented coating includes a thin transparence or glaze of protective material so that the multi-hue or colored layer is not readily scratched or marred. A feature resides in that the multi-pigmented or hued coating is sufficiently transparent or translucent in order to provide design ornamentation applied with the conventional pre-coating to be seen there-through.

5 Claims, 1 Drawing Sheet

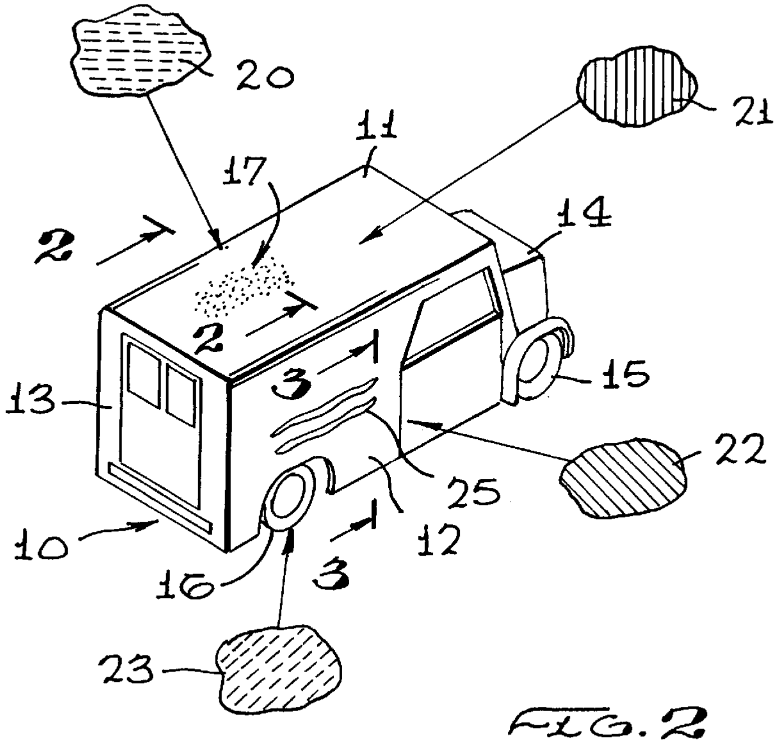
FIG. 1
FIG. 2
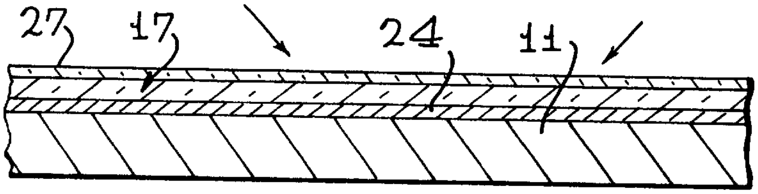
FIG. 3
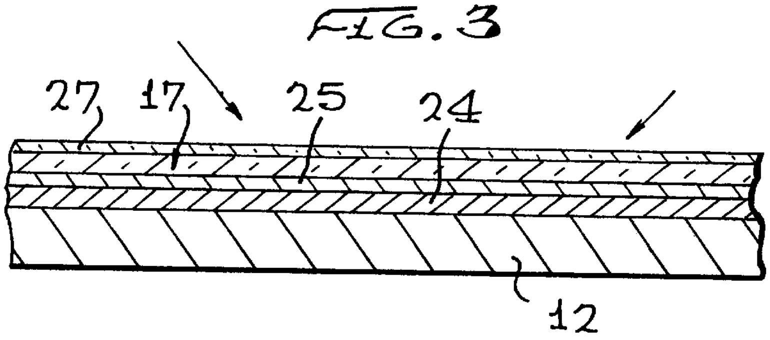
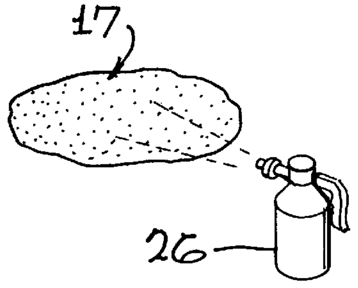
FIG. 4

CHROMATIC COLORIZATION FOR TOY VEHICLES

Priority claimed based on Ser. No. 60/097,683 filed Aug. 24, 1998.

BACKGROUND OF THE INVENTION

1. Field of the Invention

The present invention relates to the field of surface colorization for toy vehicles, and more particularly to a novel external covering for toy vehicles which is characterized by a pigment which changes shade and colorization as well as hue dependent upon incident of light or illumination impingement against the external coating. As used herein, pigment or coating refers to mirrometric technology.

2. Brief Description of the Prior Art

In the past, it has been the usual practice to place a hard color coating over toy vehicles, such as cars, soldiers or the like wherein the colorization enhances the ornamental design as well as a protection function. The external coating on such toy vehicles is monochromatic and covers the entire exterior surface in one shade or hue. Should additional colorization be desired, such additional colors are added in layers and do not mix nor form a homogeneous coating.

Therefore, a long-standing need has existed to provide a novel protective coating which is ornamental and which may be applied over conventional color coating on the external surfaces of toy vehicles such that the protective coating provides multiple shades or hues of color depending upon the incident of illumination striking the external coating.

SUMMARY OF THE INVENTION

Accordingly, the above problems and difficulties are avoided by the present invention which provides a novel external coating which provides a multi color or hue variation dependent upon the angle at which illuminating rays or energy strike the coating. The coating is applied directly over previously applied color coating and application may be by spray, brush or airbrush. The external coating is characterized as combining a plurality of pigments into a carrying medium which is then applied to the exposed surface of a previously coated toy vehicle. The multi-pigmented coating is protective and adheres directly to the previously applied conventional coating and further includes a thin transparent or glaze of protective material so that the multi hue or colored layer is not readily scratched or marred. A feature resides in that the multi-pigmented or hued coating is sufficiently transparent or translucent in order to provide design ornamentation applied with the conventional coating to be seen therethrough. The incidence of light impingement on the external multi-hued or pigmented coating determines the hue or color and the incident of light direction may be changed by moving the illumination source or by moving the toy vehicle.

Therefore, it is among the primary objects of the present invention to provide a novel external protective coating for toy vehicles which includes multi-hued or pigmented coating that permits an array of color display changeable only by differing the direction of impingement of illuminating rays from a light source.

It is another object of the present invention to provide a novel external coating for a product which includes a palette of colors employing pigmentation technology which includes a prism effect by refracting or bending light through a multi-layer flake constructed of metal oxides using a semiconductor process.

Still a further object of the present invention is to provide an external coating for toy vehicles which results in brighter colors with the appearance of a metallic and a brilliance and saturation of a tinted clear or pearl tri-coat.

Still a further object of the present invention is to provide a novel external coating for toy vehicles or the like employing a palette of colors employing a pigmentation technology which includes a prism effect by refracting or bending light through a multi-layer construction and which may be laid upon a base coat which is of a conventional coat normally placed on toy vehicles.

A further object resides in providing an external coating for toy vehicles which includes dramatic effects created by pigmentation technology so as to deliver a superior appearance and ornamental effect.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a perspective view of a toy vehicle which carries the novel coating of the present invention on its external surface and which includes indications of color developed through the prism effect;

FIG. 2 is an enlarged fragmentary sectional view of a portion of the vehicle shown in FIG. 1 as taken in the direction of arrows 2—2 thereof; and FIG. 3 is a view similar to the view of FIG. 2 illustrating the novel coating over a conventional coating as taken in the direction of arrows 3—3 of FIG. 1.

DESCRIPTION OF THE PREFERRED EMBODIMENT

Referring to FIG. 1, the novel toy vehicle of the present invention is illustrated in the general direction of arrow 10 wherein the vehicle includes a body having a roof 11, side panels on left and right, as indicated by numeral 12, an end panel 13, and a front or hood area, indicated by numeral 14. The vehicle includes front wheels 15 and rear wheels 16.

The entire external surface of the vehicle is coated with an external finish or coating and is represented in general by the numeral 17. It is to be understood that the coating 17 is placed on the roof 11, sides 12, end 13 and the hood or front area 14. However, when a light source illuminates the various areas of the vehicle as either the light moves about the vehicle or the vehicle moves about the light source, the surface coating 17 takes on a different visual hue. For example, when light is emanating from one source, the observed hue or color is indicated by numeral 20. When the light source impinges against the roof 11 from a different direction, the color or hue is indicated by numeral 21. Also, should the light source impinge against the panel 12, one color or hue is indicated by numeral 22 while movement of the light source so that it impinges against the side of the vehicle from a different angle provides an observed color or hue, as indicated by numeral 23.

Referring now in detail to FIG. 2, it can be seen that the roof of the vehicle 11 includes a first coating 24 which is of conventional technology and may be considered the usual coating placed on toy vehicles. However, the novel coating of the present invention which is carried on the toy vehicle

10 is applied over the conventional coating 24 and numeral 17 indicates the protective and decorative external coating with a clear coat layer 27.

FIG. 3 further illustrates the side panel 12 of the vehicle as having a conventional coating 24, as previously described, but further includes a decorative stripe or other ornamentation, as indicated by numeral 25. Usually the decoration 25 is for ornamental purposes and augments the overall appearance of the toy vehicle. The coating included in the present invention, as indicated by numeral 17, is carried over both the conventional coating 24 and the ornamental or decorative coating 25. In this relationship, the coating 17 is transparent or translucent in addition to carrying pigmentation so that the design of the decorative coating 25 is visually observable through the coating 17 to the observer.

FIG. 4 illustrates a typical manner in which the coating 17 is applied to the carrying surfaces which is achieved by means of an airbrush 26. However, it is to be noted that other application means may be employed for depositing the coating 17 onto the coats 24 and/or 25 respectively. After a curing time, the coating 17 becomes hard and protective. The coating is cured in ambient atmosphere after application onto the conventional paint or coatings 24 and 25.

Initially, the conventionally painted surface 24 and including 25, if applicable, are prepared by suitable cleaning using conventional undercoat systems and following conventional procedures. If desired, a wet or dry finish sanding can be used employing a 400 DA or 600 grit or finer preparation. Next, a base coat can be airbrushed onto the prepared surface using ChromaPremier as a base coat which is activated using ChromaPremier activator. By mixing only one part of ChromaPremier base coat to one part ChromaSystem basemaker, so that a slurring is provided that can thoroughly be mixed and then activate by adding one-half ounce of 12305S activator to a ready-to-spray pint of ChromaPremier base coat. By employing a ground coat of a particular shade, a plurality of colors can be selected. The use of shade pigments is critical to achieve 2–3 coat hiding at 1.2 mils. Properly preparing the surface and applying primer and/or sealer according to standard procedures is recommended. Mix the ground coat formula for a correct shade in the ChromaPremier top coat. For example, ChromaPremier shade number 4 is L9604F ground coat and by applying one coat using normal application techniques followed with the selected Chromalusion ChromaPremier topcoat color per label directions. Drying time is usually between 5 and 10 minutes usual flash techniques. The flash occurs between coats 5 to 10 minutes while airdrying is 70° Fahrenheit. Flash before clear coat is 10 to 30 minutes and flash before two-tone is 30 minutes. Force drying is not recommended.

The resultant protective and decorative coating provides a palette of colors using pigmentation technology. The pigment is completely different from traditional organic, inorganic, metallic or pearl pigments currently in use. The coating has no color of its own but creates color with a prism effect by refracting or blending light through a 5-layer flake constructed of transparent metal oxides using a semiconductor process. This results in much brighter colors, with the appearance of a metallic and the brilliance and saturation of a tinted clear or pearl tri-coat. The coating is a high performance, fast drying isocyanate-activated base coat that brings a new level of productivity to custom spot, panel and overalls. It delivers superior appearance with mirrometric pigment technology.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A vehicle having a chromatic colorization coating comprising:

a toy vehicle having a first top painted coating;

a second top coating carried on said first painted coating providing a multi-color hue variation dependent upon the visual angle at which illuminating energy rays strike said second top coating;

said second top coating characterized as combining a plurality of pigments with a carrier medium;

a thin transparence glaze of protective material covering said second top coating whereby said multi-color hue variation is protected from scratches or marring;

said second top coating is a transparent or translucent multi-pigmented coating; and said first painted top coating includes graphic representations visually observable through said second top coating.

2. The chromatic colorization coating defined in claim 1 wherein:

said second top coating is sensitive to the incidence of light impingement on said pigmented coating determining the hue or color being observed and the changes in the direction of the incidence of light reception producing changes in color or hue in response to movement of said toy vehicle.

3. The chromatic colorization coating defined in claim 2 wherein:

said second top coating includes a multi-layer flake construction of metal oxides for producing a prism effect by refracting light therethrough.

4. The chromatic colorization coating defined in claim 3 wherein:

said second top coating results in visually brighter colors with an appearance of a metallic glint and a brilliance and saturation of a tinted clear or pearl tri-coat.

5. The chromatic colorization coating defined in claim 4 wherein:

said appearance incorporates a pigment technology employing said second top coating having a high performance, fast drying isocyanate-activated base coat.

* * * * *